(12) United States Patent
Brady et al.

(10) Patent No.: US 9,013,554 B2
(45) Date of Patent: Apr. 21, 2015

(54) SYSTEMS AND METHODS FOR COMPREHENSIVE FOCAL TOMOGRAPHY

(75) Inventors: David Jones Brady, Durham, NC (US); Daniel Marks, Durham, NC (US)

(73) Assignee: Duke University, Durham, NC (US)

(*) Notice: Subject to any disclaimer, the term of this patent is extended or adjusted under 35 U.S.C. 154(b) by 566 days.

(21) Appl. No.: 13/407,047

(22) Filed: Feb. 28, 2012

(65) Prior Publication Data

US 2012/0218386 A1   Aug. 30, 2012

Related U.S. Application Data

(60) Provisional application No. 61/447,302, filed on Feb. 28, 2011.

(51) Int. Cl.
H04N 13/02 (2006.01)
(52) U.S. Cl.
CPC ......... *H04N 13/0235* (2013.01); *H04N 13/026* (2013.01)
(58) Field of Classification Search
CPC ...... G02F 1/0126; H04N 5/2258; H04N 5/30; H04N 13/0235
See application file for complete search history.

(56) References Cited

U.S. PATENT DOCUMENTS

2013/0021392 A1* 1/2013 Travis .......................... 345/694
2013/0250124 A1* 9/2013 Furry .......................... 348/164

FOREIGN PATENT DOCUMENTS

GB    02441162 A1 * 2/2008

* cited by examiner

*Primary Examiner* — Huy T Nguyen
(74) *Attorney, Agent, or Firm* — Kaplan Breyer Schwarz & Ottesen, LLP

(57) ABSTRACT

A method and system for forming a three-dimensional image of a three-dimensional scene using a two-dimensional image sensor are disclosed. Formation of a three-dimensional image is enabled by locating a coded aperture in an image field provided by a collector lens, wherein the coded aperture modulates the image field to form a modulated image at the image sensor. The three-dimensional image is reconstructed by deconvolving the modulation code from the image data, thereby enabling high-resolution images to be formed at a plurality of focal ranges.

17 Claims, 7 Drawing Sheets

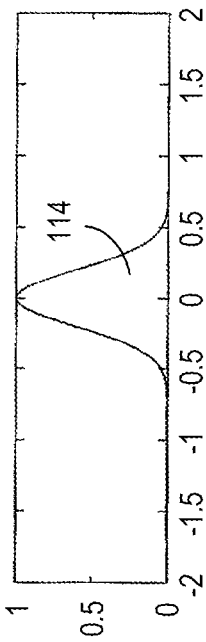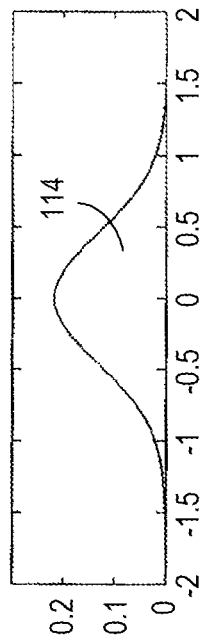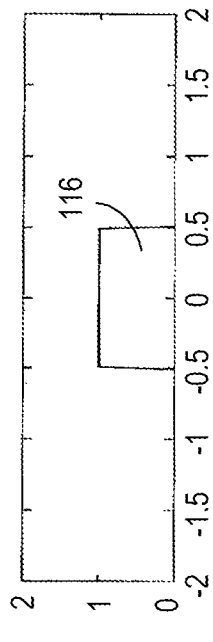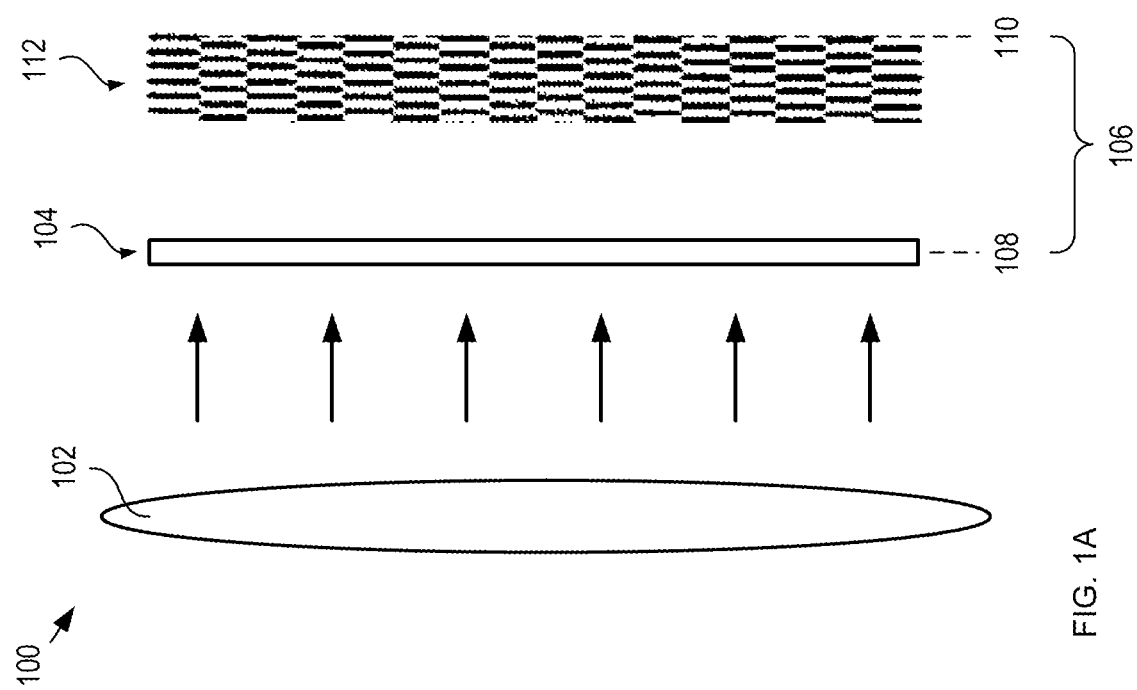

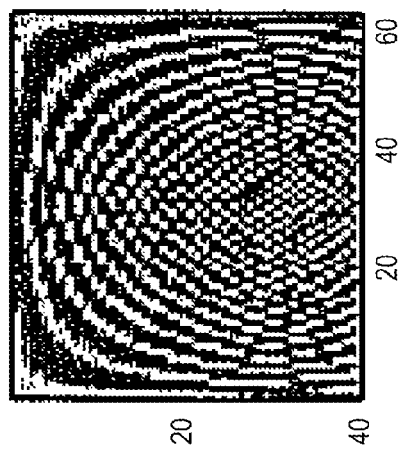
FIG. 2A
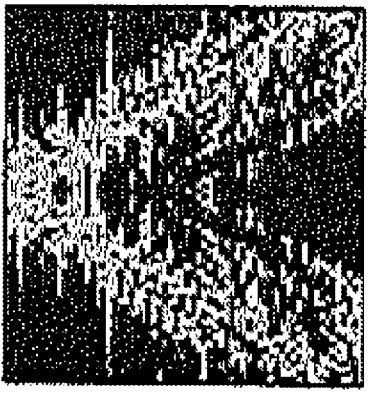
FIG. 2B
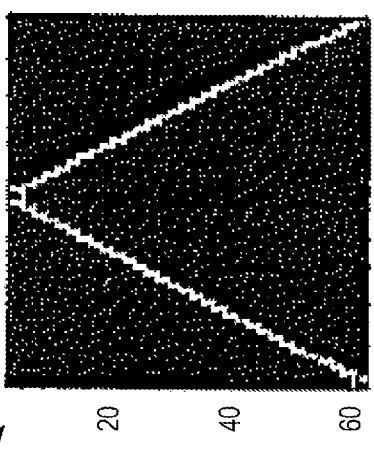
FIG. 2C
FIG. 2D

SYSTEMS AND METHODS FOR COMPREHENSIVE FOCAL TOMOGRAPHY

CROSS REFERENCE TO RELATED APPLICATIONS

This application claims the benefit of U.S. Provisional Patent Application Ser. No. 61/447,302, filed Feb. 28, 2011, entitled "Systems and Methods for Comprehensive Focal Tomography," which is incorporated herein by reference.

If there are any contradictions or inconsistencies in language between this application and the case that has been incorporated by reference that might affect the interpretation of the claims in this case, the claims in this case should be interpreted to be consistent with the language in this case.

STATEMENT REGARDING FEDERALLY SPONSORED RESEARCH

This invention was made with Government support under N66001-11-1-4002 awarded by DARPA. The Government has certain rights in the invention.

FIELD OF THE INVENTION

The present invention relates to imaging in general, and, more particularly, to tomographic imaging.

BACKGROUND OF THE INVENTION

The formation of a high-resolution three-dimensional image of a scene using a two-dimensional image sensor remains a complicated operation in modern optics. Ideally, a camera could reconstruct an image of the scene over the entire range of object distances without requiring scanning of the camera focus of the range. Preferably, the three-dimensional image could be acquired in a single snapshot. Unfortunately, modern cameras are still characterized by the need focus on only a single plane of the object and light from other ranges of the scene serve only to degrade the image formed by the camera rather than contribute useful image data.

Various volume-imaging cameras for reconstructing three-dimensional images using multiplexed measurements have been presented in the prior art. Typically, these approaches apply digital processing to invert multiplexed image data and estimate the three-dimensional object. Recently, volume imagers have evolved from analog two-dimensional slice selection to using computation to estimate a complete volume image.

Unfortunately, the strategies employed in modern volume imaging, such as focal scanning, radiance sampling, and wavefront coding universally trade reductions in transverse or temporal resolution for improved longitudinal resolution.

Scanning the focus of a lens through a range of depths-of-field (i.e., focal scanning) is one method for volume imaging. The simplest approach for focal scanning is based on the use autofocus as applied to conventional digital cameras. In such an approach, a sharpness metric is optimized at a plurality of depths-of-field to form a series of two-dimensional images. These two-dimensional images are then combined to realize a three-dimensional image.

Unfortunately, sequential acquisition of any reasonable number of two-dimensional images is inefficient and reduces the effective frame acquisition rate.

Radiance sampling uses a light-field camera that is based on a microlens array to attempt to characterize the radiance at each point in the three-dimensional image volume of the camera. Although showing some promise as volume-imaging technique, radiance-sampling cameras are likely to suffer from modal error. Further, lateral image resolution is limited by the aperture diameter of the lenslets used to form the camera.

Wavefront coding is a form of computational photography that uses a cubic-phase modulating element in conjunction with deconvolution to extend the depth of field of a digital imaging system such as a video camera. Unfortunately, wavefront coding reduces the modulation transfer function at all focal ranges of the imaging system, which degrades transverse image resolution.

A means for developing a high-resolution three-dimensional rendering of a three-dimensional scene using a two-dimensional image sensor that overcomes some of the disadvantages of prior-art imaging systems would be a significant advance in the state of the art.

SUMMARY OF THE INVENTION

The present invention enables snapshot imaging of a three-dimensional scene with high image resolution. Embodiments of the present invention are particularly well suited for use in surveillance, astrophysics, metrology, biomedical imaging, and military targeting.

An illustrative embodiment of the present invention comprises a volume imaging system based on focal tomography. The system applies image estimation algorithms to a modulated image from a scene to simultaneously achieve substantially diffraction-limited-resolution images at a plurality of focus ranges of the scene. The imaging system includes a collector lens that forms an image field of the scene. A three-dimensional reference structure modulates the image field to form a modulated image at the entrance of a camera. The camera produces electrical signals based on the modulated image that are provided to a processor. The processor applies the image estimation algorithms to the electrical signals to effectively deconvolve the code present at different depths in the reference structure from the modulated signal, thereby producing high-resolution two-dimensional images of the scene at different focus ranges.

In some embodiments, the reference structure comprises a volume distribution of nanoparticles that modulate the image field via optical scattering. Models of the scattering induced at each of a plurality of cross-sectional segments of the reference structure are provided to the processor for use in reconstructing the image field of the scene.

In some embodiments, the reference structure includes elements other than scattering particles and induces an optical effect other than scattering, such as refraction, diffraction, or absorption, to modulate the image field. In some embodiments, the reference structure applies a modulation that is based on amplitude. In some embodiments, the reference structure applies a modulation that is based on phase.

In some embodiments the reference structure comprises one or more two-dimensional coded apertures. The codes for these two-dimensional coded apertures form the basis for image restoration algorithms used by the processor to reconstruct the image field from the modulated image.

In some embodiments, relative motion between the image field and the camera is induced to improve the resolution of the reconstructed image field. In some of these embodiments, adaptive focus techniques are used to induce the relative motion. In some of these embodiments, an actuator moves the camera to induce the relative motion.

An embodiment of the present invention comprises a method for imaging a three-dimensional scene, the method comprising: modulating an image field to provide a modulated image; receiving the modulated image at a camera comprising a focal-plane array; generating a plurality of electrical signals based on the modulated image; and processing the plurality of electrical signals to reconstruct the image field at a plurality of focal ranges.

BRIEF DESCRIPTION OF THE DRAWINGS

FIG. 1A depicts an exemplary optical system suitable for image-space coding.

FIG. 1B depicts a model of a focal spot of a Gaussian signal focused on image plane 108.

FIG. 1C depicts the width of focal spot 114 after it has traversed the separation distance between image plane 108 and image plane 110.

FIG. 1D depicts the width of transmission feature 116, which is representative of the transmission features of reference structure 104.

FIGS. 2A-H depict singularity vectors that demonstrate the benefits of image-space coding.

DETAILED DESCRIPTION

Image-Space Coding

Figure 2F:
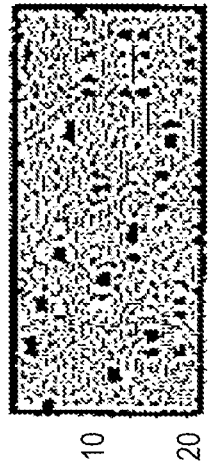
Figure 2H:
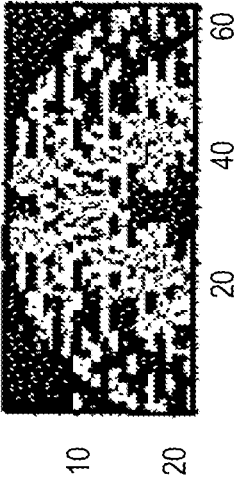
Figure 2E:
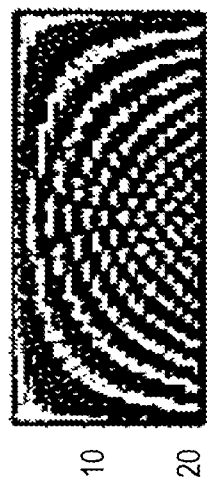
Figure 2G:
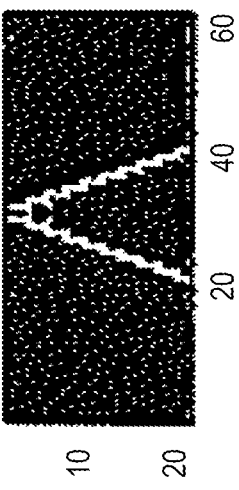

The present invention is based on a technique referred to as "image-space coding." Image-space coding enables the rendering of a three-dimensional image of a three-dimensional scene using a two-dimensional image sensor, such as a camera or focal-plane array. When used to image a three-dimensional scene, a collector lens provides a three-dimensional image field. Only one slice of the scene is in focus at the plane of the two-dimensional image sensor, however. The remainder of the scene is unfocused at the image sensor. As a result, the information about the scene in the unfocused portion of the image field is blurred due to defocus, diffraction, and filtering by the image sensor.

Image-space coding enables substantially all of the information in the image field to be captured by placing a coded image-field modulator (i.e., a reference structure) in the image field. The image-field modulator aliases features from the unfocused regions of the image field into the passband of the image sensor. These features are substantially convolved with the coding of the image-field modulator. As a result, the coding of the image-field modulator can be backed-out of (i.e., deconvolved from) the received image, thereby enabling reconstruction of images with best focus transverse resolution at a plurality of longitudinal portions of the total focal range (i.e., range bins).

FIG. 1A depicts an exemplary optical system suitable for image-space coding. Optical system 100 includes lens 102 and reference structure 104. Reference structure 104 is located in the image field 106 of lens 102, which extends from image plane 108 to image plane 110. Specifically, reference structure 104 is located at image plane 108.

Reference structure 104 is an exemplary reference structure having uniformly distributed rectangular transmissive regions having a width approximately equal to 1 (arbitrary units) and a duty cycle of approximately 50%. A first portion of the light from lens 102 is focused at image plane 108. A second portion of the light from lens 102 is focused at image plane 110. By introducing reference structure 104 at image plane 108, the Fresnel diffraction after modulation by reference structure 104 results in modulated image-field 112 at image plane 110. The Fresnel diffraction can be readily modeled, as shown in FIGS. 1B-D.

FIG. 1B depicts a model of a focal spot of a Gaussian signal focused on image plane 108. Focal spot 114 has a width approximately equal to the width of a transmissive region of reference structure 104 (i.e., a width equal to 1).

FIG. 1C depicts the width of focal spot 114 after it has traversed the separation distance between image plane 108 and image plane 110. The distance between these planes is such that the width of focal spot 114 increases by approximately a factor of four.

FIG. 1D depicts the width of transmission feature 116, which is representative of the transmission features of reference structure 104.

FIGS. 2A-H depict singularity vectors that demonstrate the benefits of image-space coding. Plots 200, 202, 204, 206, 208, 210, 212, and 214 depict results for an optical signal in optical system 100, wherein the optical signal is modeled as a coherent image of 64 spots focused on either image plane 108 or image plane 110. The Gaussian beam for each image spot is multiplied by the reference structure transmittance and propagated to image plane 110 using a Fresnel transformation. The squared magnitude of the resulting diffraction pattern is then taken to find the impulse response. Each impulse response is a column in a matrix that maps the input signal onto the output signal. The singular vectors of the matrix represent projections sampled on the input signal with efficiency given by the singular values.

Plot 200 depicts object space singular vectors for a focal image at image plane 110 without reference structure 104 located at image plane 108.

Plot 202 depicts object space singular vectors for a focal image at image plane 110 with reference structure 104 located at image plane 108.

Plot 204 depicts the spatial spectrum of the object space singular vectors for a focal image at image plane 110 without reference structure 104 located at image plane 108.

Plot 206 depicts the spatial spectrum of the object space singular vectors for a focal image at image plane 110 with reference structure 104 located at image plane 108.

Plot 208 depicts object space singular vectors for a focal image at image plane 108 without reference structure 104 located at image plane 108.

Plot 210 depicts object space singular vectors for a focal image at image plane 108 with reference structure 104 located at image plane 108.

Plot 212 depicts the spatial spectrum of the object space singular vectors for a focal image at image plane 108 without reference structure 104 located at image plane 108.

Plot 214 depicts the spatial spectrum of the object space singular vectors for a focal image at image plane 108 with reference structure 104 located at image plane 108.

It can be seen from FIGS. 2A-H that without reference structure 104, imaging system 100 is shift invariant and the singular vectors are harmonic functions. The inclusion of reference structure 104 significantly broadens the bandwidth of the singular vectors so that even low-order singular vectors sample high-resolution features. In addition, the singular vectors span the full Fourier space of the system even when the range of singular vectors is reduced to match the reduced singular value spectrum. Further, one skilled in the art will recognize that even though the number of degrees of freedom captured by a camera located at image plane 110 would be degraded by image-space coding, the resolution of the high singular value sampling patterns is improved in defocused image plane 108 and maintained in focused image plane 110.

Still further, without reference structure 104, the image formed at image plane 110 is blurred due to defocus and diffraction. Although the image formed at image plane 110 is still blurred after modulation by reference structure 104, high-resolution features can be computationally recovered using compressive sampling and signal inference, such as is disclosed in U.S. Pat. Nos. 7,616,306, 7,532,772, 7,463,179, 7,463,174, 7,432,843, 7,427,932, 7,283,231, and 7,912,173, each of which is incorporated herein by reference. It is an aspect of the present invention, therefore, that image-space coding, used in conjunction with decompressive signal interference can enable simultaneous reconstruction of the complete image field with diffraction-limited resolution by a camera located at image plane 110 (or located at a slightly greater distance from lens 102).

Figure 3:
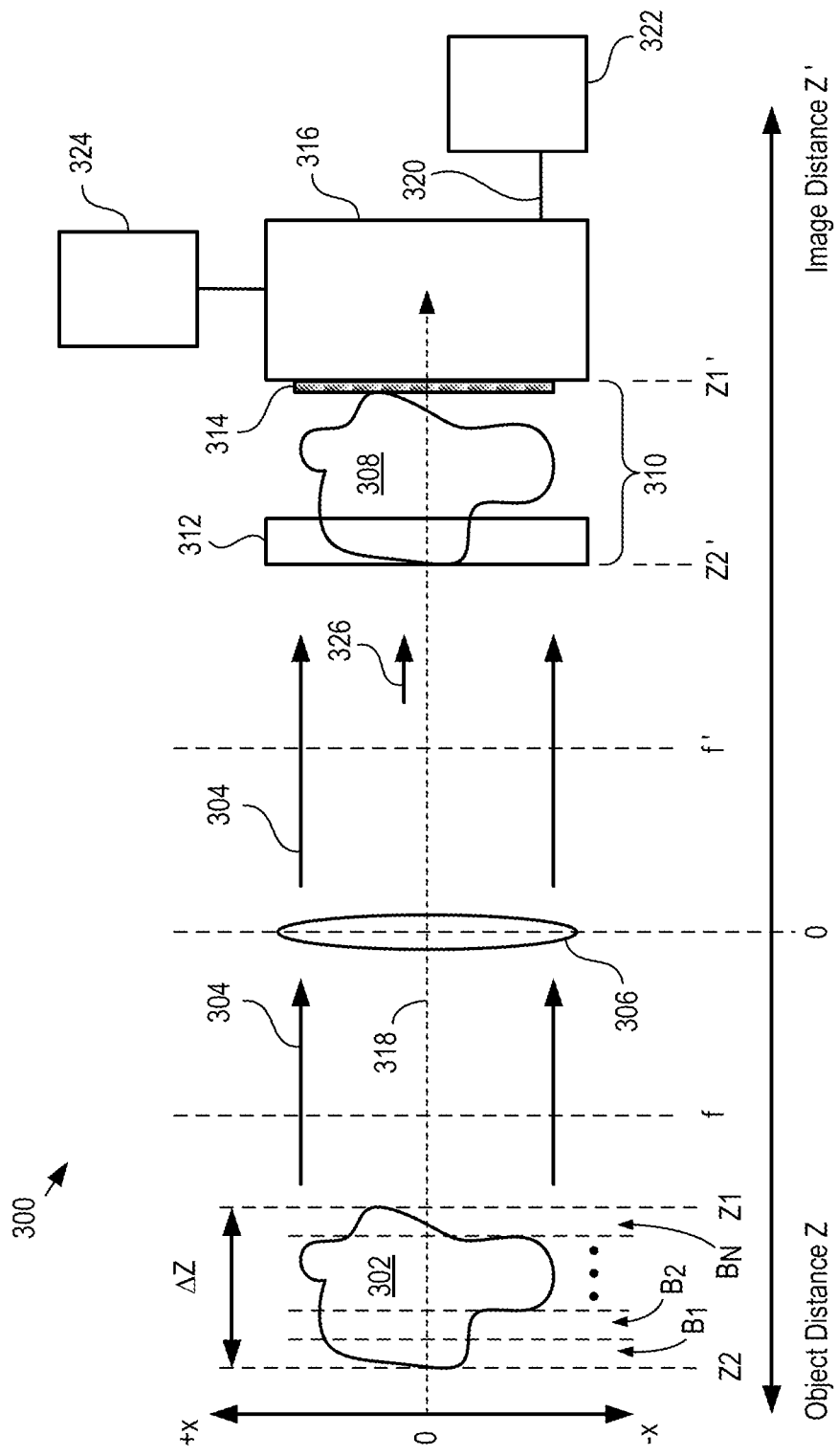
FIG. 3 depicts a schematic diagram of an image-space-coding imaging system in accordance with an illustrative embodiment of the present invention.

FIG. 3 depicts a schematic diagram of an image-space-coding imaging system in accordance with an illustrative embodiment of the present invention. System 300 comprises lens 306, reference structure 312, camera 316, processor 322, and actuator 324. System 300 is an imaging system suitable for simultaneously generating high-resolution images of scene 302 at multiple ranges of camera focus. Lens 306, reference structure 312, and camera 316 are arranged along and centered on optical axis 318.

Figure 4:
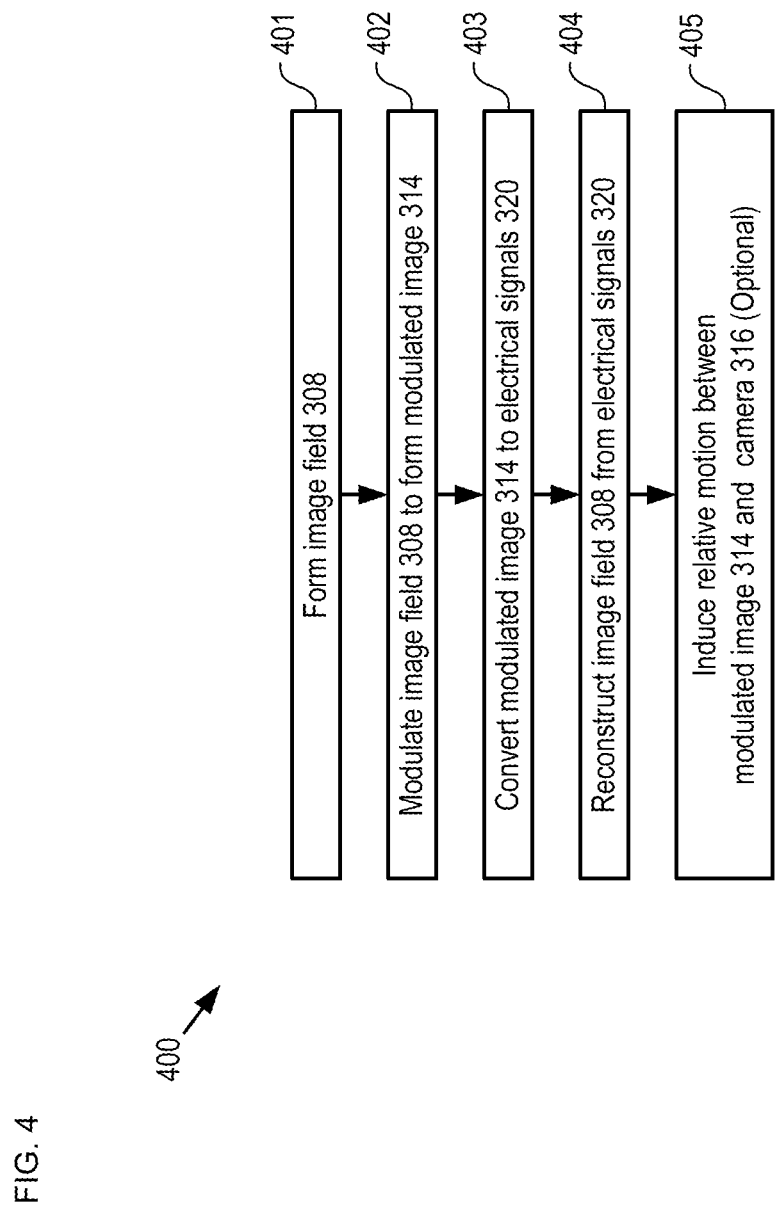
FIG. 4 depicts operations of a method suitable for forming a high-resolution image of a three-dimensional scene in accordance with the illustrative embodiment of the present invention.

FIG. 4 depicts operations of a method suitable for forming a high-resolution image of a three-dimensional scene in accordance with the illustrative embodiment of the present invention. Method 400 begins with operation 401, wherein lens 306 receives light 304 from scene 302.

Lens 306 is a conventional lens having a focal length, f. Lens 306 is suitable for receiving light 304 from three-dimensional scene 302 and providing three-dimensional image field 308. Scene 302 has a depth of field of $\Delta Z$, which is divided into a number of range bins $B_1$ through $B_N$, where N is a user-defined number based on system 300. Each range bin B represents a longitudinal portion (i.e., slice) of scene 302. In some embodiments, each of bins $B_1$ through $B_N$ has a longitudinal thickness approximately equal to $\Delta Z/N$. The point of scene 302 nearest to lens 306 is at minimum object distance, Z1, and the point of scene 302 furthest from lens 306 is at maximum object distance, Z2. As a result, lens 306 forms image field 308 having focal depth 310 that extends along propagation direction 326 from minimum image distance Z2' to maximum image distance Z1', where $Z2'=(Z2*f)/(Z2-f)$ and $Z1'=(Z1*f)/(Z1-f)$. The lateral extent of image field 308 is bounded by $|x(Z')|$, which is less than $(|x(Z)|*f)/(Z-f)$, where Z is the object distance from lens 306 and $|x(Z)|$ is the maximum lateral extent of scene 302 from optical axis 318 at object distance Z.

At operation 402, reference structure 312 modulates image field 308 to form modulated image 314.

Figure 5:
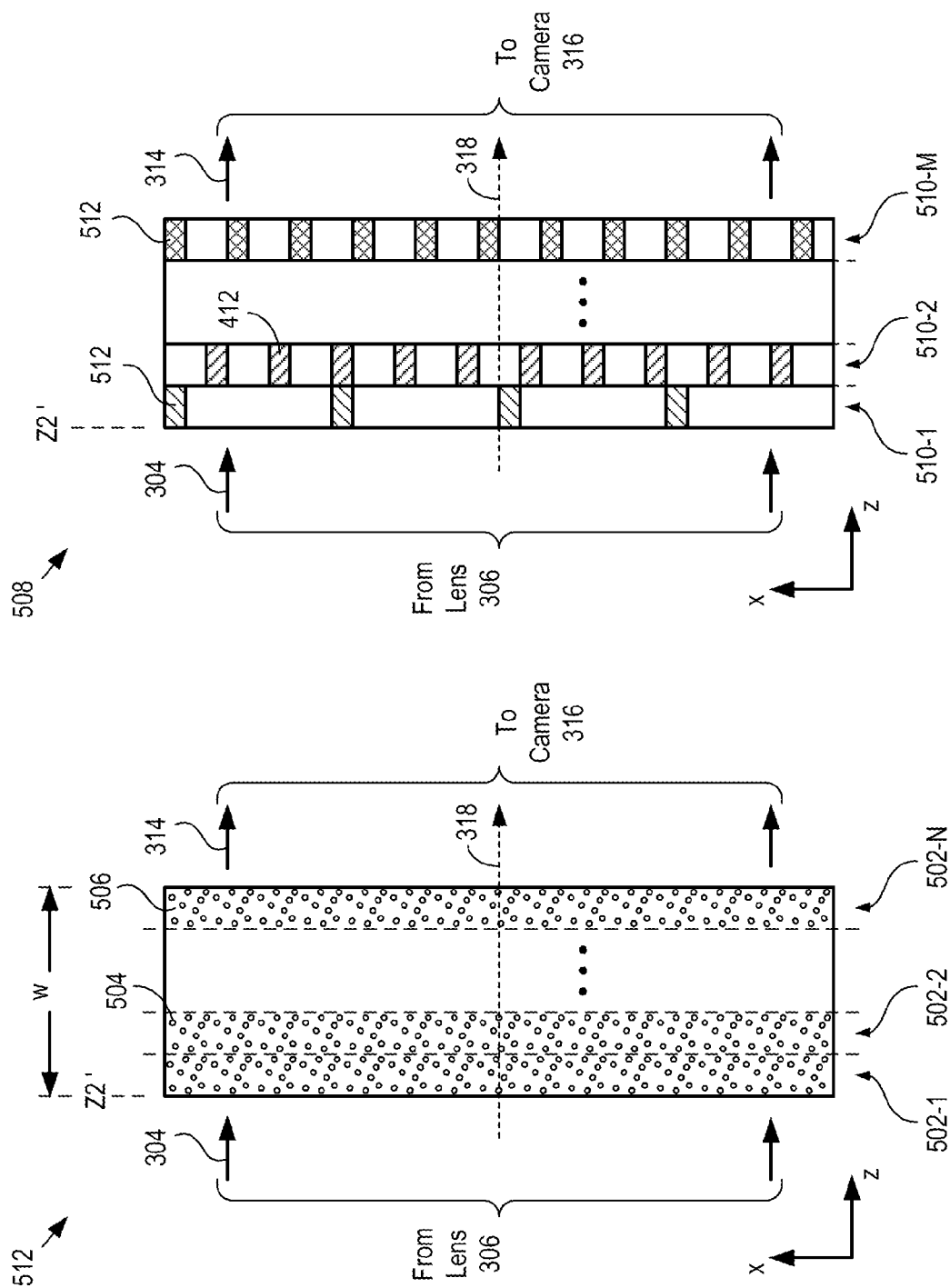
FIG. 5A depicts a schematic drawing of a cross-sectional image of reference structure 312 in accordance with the illustrative embodiment of the present invention.
FIG. 5B depicts a schematic drawing of a cross-sectional view of a reference structure in accordance with an alternative embodiment of the present invention.

FIG. 5A depicts a schematic drawing of a cross-sectional image of reference structure 312 in accordance with the illustrative embodiment of the present invention.

Reference structure 312 is an image-field modulator that forms modulated image 314 by aliasing features of the defocused regions of image field 308 into camera 316. As a result, reference structure 312 enables a substantial increase in the spatial bandpass of the defocused regions of the image field without reducing the spatial bandpass of the light focused at the focal plane located at Z1' (i.e., at camera 316).

Reference structure 312 is a volume distribution of nanoparticles 504 suspended in a substantially transparent medium 506. One skilled in the art will recognize that there are many materials suitable for use as medium 506, including, without limitation, polyvinyl alcohol, polycarbonate, polymethal methacrylate, and the like.

Nanoparticles 504 are substantially circular particles having a diameter that is based on the wavelength of light 304. Suitable materials for nanoparticles 504 include, without limitation, silver, gold, and the like. The diameter of nanoparticles 504 influences the resolution with which processor 322 can reconstruct image field 308. Since the overall goal is to reconstruct images with diffraction limited in-focus resolution at multiple defocus planes, modulation features in the focal volume should be on the scale of the in-focus resolution, which is equal to the wavelength of light 304 times the f-number of lens 306. This means that the diameter of nanoparticles 504 is approximately equal to the wavelength times the f-number. Smaller nanoparticles may be used to control the magnitude of the modulation or to bring the frequency of the modulation into the Nyquist range of wavelength*f-number/2. The nanoparticle spacing will be on the scale of the nanoparticle size. In some embodiments, the diameter of nanoparticles 504 is within the range of approximately 1 nanometer (nm) to approximately 1000 nm. In some embodiments, the diameter of nanoparticles is within the range of approximately 50 nm to approximately 1000 nm. In some embodiments, the diameter of nanoparticles 504 is selected based on the image resolution desired. In some embodiments, the diameter of nanoparticles 504 is greater than 1000 nm.

Reference structure 312 is a single, continuous plate having width, w. Optically, however, reference structure 312 is segmented into a plurality of cross-sectional segments, 502-1 through 502-N, where N is the number of discrete range bins, B, to be estimated. The coding represented by the distribution of nanoparticles 502 within each cross-sectional segment is characterized using point source or known target calibration to develop a model for that cross-sectional segment. These models are provided to processor 322 for its use in estimating image field 308 for each of range bins $B_1$ through $B_N$ of scene 302.

It should be noted that reference structure 312 represents only one possible coding scheme suitable for use with embodiments of the present invention. While reference structure 312 modulates image field 308 by scattering, suitable alternative modulation techniques include absorption, refraction, and diffraction, as well as other optical field-matter interactions.

Further, while reference structure 312 modulates image field 308 via a volume distribution of nanoparticles, alternative coded reference features suitable for use in reference structures in accordance with the present invention include, without limitation:

i. two-dimensional coded apertures that include intermingled transmissive and non-transmissive regions at any of a variety of duty factors; or ii. a plurality of such two-dimensional coded apertures that are stacked to form a three-dimensional volume distribution of intermingled transmissive and non-transmissive regions; or iii. volume distributions of image-feature scale lenslets or other refractive elements; or iv. arrays of lenslets focused at diverse ranges in the focal volume; or v. three-dimensional arrays of optical fibers; or vi. volume holograms; or vii. three-dimensional graded-index material; or viii. any combination of i, ii, iii, iv, v, vi, and vii.

FIG. 5B depicts a schematic drawing of a cross-sectional view of a reference structure in accordance with an alternative embodiment of the present invention. Reference structure 508 comprises two-dimensional coded apertures 510-1 through 510-M, where M is any practical number.

Each of coded apertures 510-1 through 510-M is a substantially transparent glass plate having a two-dimensional arrangement of non-transmissive regions 512, where the arrangement of non-transmissive regions 512 is different in each coded aperture. For each coded aperture, therefore, a model based on the arrangement of its non-transmissive regions can be developed and stored in processor 322.

Coded apertures 510-1 through 510-M are stacked along the direction of optical path 324 to collectively define three-dimensional reference structure 508.

At operation 405, modulated image 314 is received by camera 316, which converts it into electrical signals 320. Camera 316 is located in the image space of lens 306 at a distance equal to or greater than Z1'. That portion of image field 308 that is focused at a focal plane located at Z1', therefore, is focused at camera 316. The remaining portions of image field 308, however, are defocused at camera 316.

Figure 6:
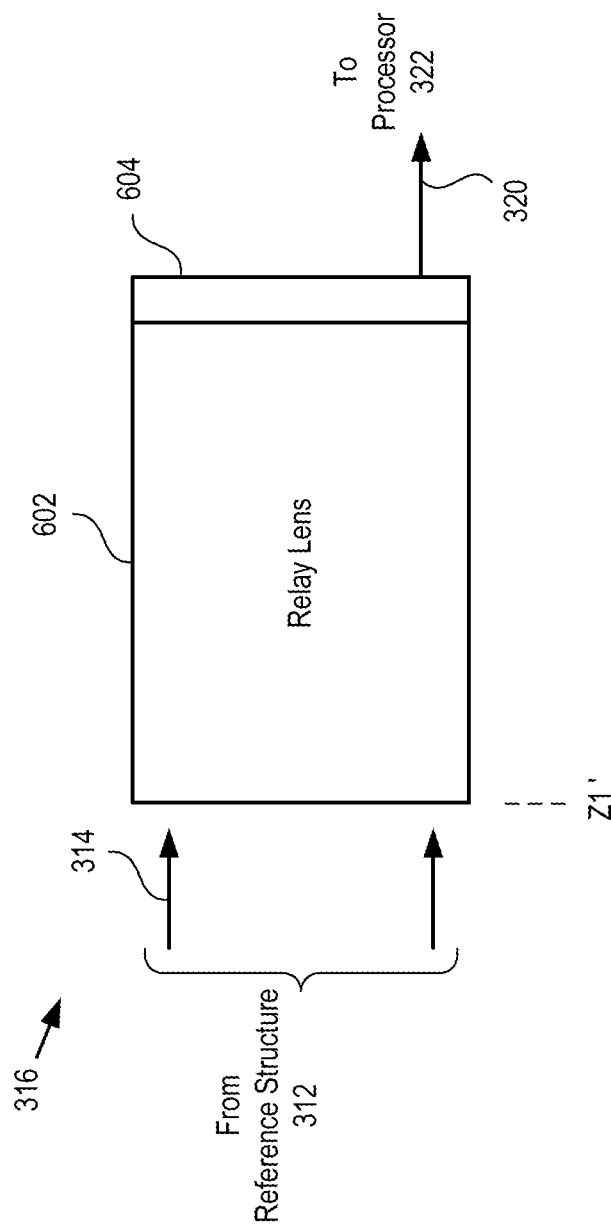
FIG. 6 depicts a schematic drawing of a cross-sectional view of a camera in accordance with the illustrative embodiment of the present invention.

FIG. 6 depicts a schematic drawing of a cross-sectional view of a camera in accordance with the illustrative embodiment of the present invention. Camera 316 comprises relay lens 602 and focal-plane array 604.

Relay lens 602 is a conventional relay lens having high depth-of-focus. It will be clear to one skilled in the art how to specify, make, and use relay lens 602. Relay lens 602 is located at distance Z1' of image field 308. In some embodiments, relay lens 602 is located at a somewhat greater image distance from lens 306.

Focal-plane array 604 is a two-dimensional array of device elements, each of which generates one of electrical signals 320 based on the intensity of light in the portion of modulated image 314 incident upon it. Device elements suitable for use in focal-plane array 604 include, without limitation, photo-diodes, avalanche photodiodes, p-i-n photodiodes, metal-semiconductor junction devices, charge-coupled devices (CCD's), and the like. It will be clear to one skilled in the art how to specify, make, and use focal-plane array 604.

In some embodiments, camera 316 does not include relay lens 602 and focal-plane array 604 is located at Z1' or at a somewhat greater image distance from lens 306.

It should be noted that, in some embodiments, in operation 403, the scattering features of reference structure 312 aliases high-resolution information in image field 308 into a low-pass filter of camera 316. This enables full three-dimensional and/or extended depth-of-field reconstruction of image field 308 up to the diffraction-limited resolution of lens 306.

At operation 404, image field 308 is reconstructed from modulated image 314 based on electrical signals 320 and the coding models of cross-sectional segments 302-1 through 302-N stored in processor 322. Processor 322 estimates an image of scene 302 at each of range bins $B_1$ through $B_N$ using decompressive signal inference.

At optional operation 405, relative motion between modulated image 314 and camera 316 is induced. Actuator 324 is a conventional motor configured to translate and/or shake camera 316. In some embodiments, relative motion between modulated image 314 and camera 316 is induced by imparting focal changes in system 300 via a conventional adaptive focus system. In some embodiments, the natural motion of scene 302 is sufficient to enable improved decompressive inference.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method for imaging a three-dimensional scene, the method comprising:
   providing a reference structure that is physically adapted to modulate an image field, wherein the reference structure includes a first element that is selected from the group consisting of a two-dimensional coded aperture, a volume distribution of lenslets having a size based on the first resolution, an array of lenslets that are focused at a plurality of focal ranges within the focal volume, a three-dimensional array of optical fibers, a volume hologram, a volume distribution of particles, and a three-dimensional graded index material;
   modulating the image field via the reference structure to provide a modulated image;
   receiving the modulated image at a camera comprising a focal-plane array;
   generating a plurality of electrical signals based on the modulated image; and
   processing the plurality of electrical signals to reconstruct the image field at a plurality of focal ranges.

2. The method of claim 1 wherein the image field is modulated in the near-focus volume.

3. The method of claim 2 wherein the image field is modulated by transmitting it through the reference structure to induce an optical effect on the light of the image field.

4. The method of claim 3 wherein the reference structure is provided such that the optical effect is selected from the group consisting of scattering, refraction, diffraction, and absorption.

5. The method of claim 1 wherein the reference structure is provided such that the first element is selected as a volume distribution of particles that have a dimension within the range of approximately 1 nanometer to approximately 1000 nanometers.

6. The method of claim 5 further comprising:
   providing a plurality of codes to a processor, each of the plurality of codes being based on the optical effect induced by a different one of a plurality of cross-sectional segments of the coded aperture;
   wherein the processor processes the plurality of electrical signals and the plurality of scattering models to reconstruct the image field at the plurality of focal ranges.

7. The method of claim 1 wherein the first element is selected as a two-dimensional coded aperture, and wherein the reference structure is provided such that it comprises a plurality of two-dimensional coded apertures that includes the first element, the plurality of two-dimensional coded apertures being sequentially arranged along a propagation direction of light of the image field.

8. The method of claim 1 further comprising inducing a relative motion between the modulated image and the camera.

9. The method of claim 8 wherein the relative motion is induced via adaptive focus techniques.

10. The method of claim 8 wherein the relative motion is induced via imparting a motion on the camera.

11. A system for imaging a three-dimensional scene, the system comprising:
- a first lens that is physically adapted to provide an image field that is based on the three-dimensional scene;
- a reference structure that is located in the image field, the reference structure being physically adapted to modulate the image field and provide a modulated image, and the reference structure including a first element selected from the group consisting of a two-dimensional coded aperture, a volume distribution of lenslets having a size based on the first resolution, an array of lenslets that are focused at a plurality of focal ranges within the focal volume, a three-dimensional array of optical fibers, a volume hologram, a volume distribution of particles, and a three-dimensional graded index material; and
- a camera that includes a focal-plane array, the camera being physically adapted to receive the modulated image and provide a plurality of electrical signals based on the modulated image.

12. The system of claim 11 further comprising a processor, the processor being dimensioned and arranged to reconstruct the image field at a plurality of focal ranges of the first lens.

13. The system of claim 11 wherein the first element is a volume distribution of particles that have a dimension within the range of approximately 1 nanometer to approximately 1000 nanometers.

14. The system of claim 11 further comprising a plurality of coded apertures that collectively defines the reference structure, the plurality of coded apertures including the first element, and the first element being a two-dimensional coded aperture.

15. The system of claim 11 wherein the processor comprises a database that includes a plurality of codes, each of the plurality of codes being based on an optical effect induced by a different one of a plurality of cross-sectional segments of the reference structure.

16. The system of claim 11 further comprising an actuator for inducing relative motion between the modulated image and the camera.

17. The system of claim 11 wherein the first lens is an adaptive-focusing lens, and wherein the first lens is physically adapted to induce relative motion between the modulated image and the camera.

* * * * *